United States Patent [19]

Ullmann

[11] 4,264,826
[45] Apr. 28, 1981

[54] APPARATUS FOR GENERATING THERMAL ENERGY AND ELECTRICAL ENERGY

[75] Inventor: Werner Ullmann, Muralto-Locarno, Switzerland

[73] Assignee: Elmapa NV, Curacao, Netherlands Antilles

[21] Appl. No.: 937,847

[22] Filed: Aug. 29, 1978

[30] Foreign Application Priority Data

Sep. 14, 1977 [CH] Switzerland ............ 11244/77

[51] Int. Cl.³ .............................................. B60L 1/02
[52] U.S. Cl. .................................. 290/2; 122/26; 126/247; 237/12.1; 432/63
[58] Field of Search ...................... 62/238 E, 324 D; 126/247; 122/26; 237/2 B, 12.1; 432/63; 290/2

[56] References Cited

U.S. PATENT DOCUMENTS

| | | | |
|---|---|---|---|
| 2,189,895 | 2/1940 | Grutzner | 237/12.1 |
| 2,218,793 | 10/1940 | Horton et al. | 62/238 E |
| 3,214,100 | 10/1965 | Aronson et al. | 237/12.1 |
| 4,027,631 | 6/1977 | Lavery | 122/26 |
| 4,060,194 | 11/1977 | Lutz | 126/247 X |
| 4,065,055 | 12/1977 | De Cosimo | 237/12.1 |

Primary Examiner—Albert W. Davis
Assistant Examiner—Margaret A. Focarino
Attorney, Agent, or Firm—Lane, Aitken, Ziems

[57] ABSTRACT

An apparatus for generating thermal and electrical energy includes an internal combustion engine connected to and adapted to drive a generator for providing electrical power and a brake for generating thermal energy. In one embodiment, a heat carrier flows through appropriate conduits for absorbing heat energy from the brake, from the combustion chamber of the engine, and from the engine exhaust gases and delivers the heat energy to a end-use heat exchanger, for example, a room or space heater. In a second embodiment, the engine exhaust gas flow is used to drive a gas turbine that, in turn, drives a compressor in a thermal cycle to provide additional heat transfer capability.

9 Claims, 2 Drawing Figures

APPARATUS FOR GENERATING THERMAL ENERGY AND ELECTRICAL ENERGY

BACKGROUND OF THE INVENTION

The present invention relates to a new and improved construction of apparatus for generating thermal or heat energy and electrical energy.

There have already been proposed the most different types of apparatuses for producing thermal energy. Extensively employed is the technique of burning fossil fuels or energy supplies, such as coal, natural gas and petroleum. The calorific or heating value of such fuels or energy supplies, however, for different reasons during their combustion and heat transmission, can only be usefully gained to a certain, relatively low degree. In this regard mention is made of the conventional fuel oil heating by means of an oil burner.

SUMMARY OF THE INVENTION

It is a primary object of the present invention to provide a new and improved construction of apparatus for generating thermal energy and electrical energy in a manner wherein fossil fuels can be more gainfully utilized than heretofore.

Still a further significant object of the present invention aims at the provision of a new and improved construction of apparatus for producing heat energy and electrical energy in an extremely reliable, simple and economical fashion, with better efficiency and utilization of the combustible fuel.

Now in order to implement these and still further objects of the invention, which will become more readily apparent as the description proceeds, the apparatus of this development is manifested by the features that there is provided an internal-combustion engine having a power take-off shaft and serving as a drive. Connected with this power take-off shaft is a generator intended to produce electrical energy and also a brake intended to produce thermal or heat energy. The brake provides a first source of heat energy, the engine coolant provides a second source of heat energy, and the engine exhaust gas provides a third source of heat energy, with the heat energy from these three sources being recovered for heating purposes.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1A illustrates a modification of the exhaust gas heat exchanger illustated in FIG. 1 in which the exhaust gases are subjected to a scrubbing action;

DETAILED DESCRIPTION OF THE PREFERRED EMBODIMENTS

Figure 1:
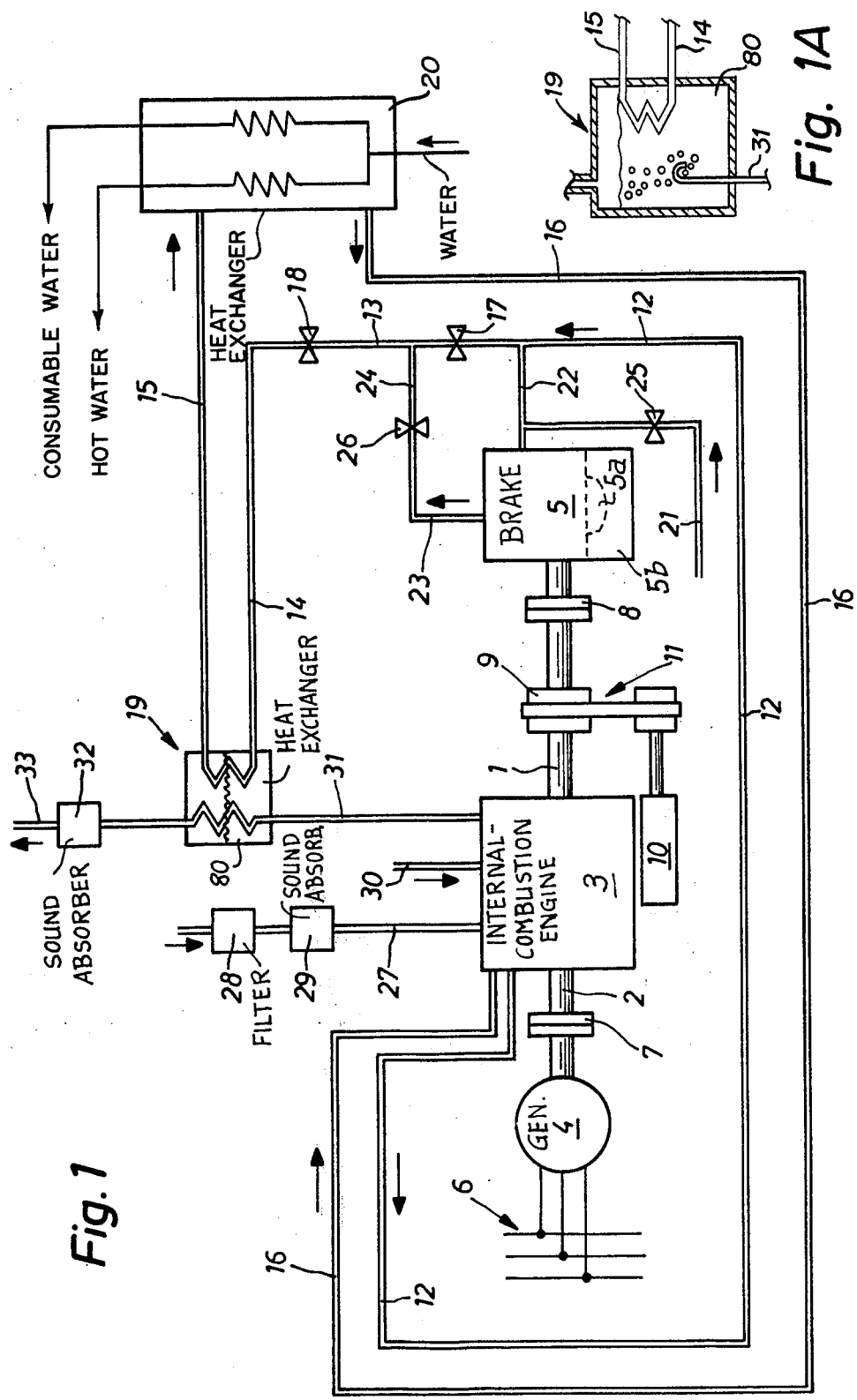
FIG. 1 schematically illustrates a first exemplary embodiment of apparatus for generating both thermal energy and electrical energy.

Describing now the drawings, with the exemplary embodiment of apparatus shown in FIG. 1 there is provided an internal-combustion engine 3, which may be for instance, a Diesel engine, having a power take-off shaft or shafting 1, 2. Seated upon the power take-off shaft or shafting 1,2 and specifically upon the shaft 2 is a generator 4 intended to produce electrical energy and upon the shaft 1 a brake 5 intended to produce thermal or heat energy. Between the internal-combustion engine 3 and the generator 4, which supplies the network 6 with electrical energy, there is located a disconnecting coupling 7 or equivalent structure for the purpose of selectively coupling and decoupling the generator 4 from the internal-combustion engine or motor 3. Between the internal-combustion engine 3 and the brake 5 there is arranged a disconnecting coupling 8 or equivalent structure and a freewheeling coupling 9. The internal-combustion engine 3 can be started-up by means of an electrical starter motor 10 through a drive connection 11 containing the freewheeling coupling 9. Both of the power take-off shafts or journals 1 and 2 of the internal-combustion engine 3 can have the same rotational speed; however they also can be stepped-up or stepped-down by means of any suitable transmission or gearing (not shown) in relation to the rotational speed of the crankshaft of the engine 3.

The internal-combustion engine 3 has a combustion chamber merely schematically indicated by reference character 3a. This internal combustion engine 3 can be water cooled or air cooled, and in either case has a cooling agent-circulation system incorporating the lines or conduits 12 to 16. If the internal-combustion engine 3 is preferably water cooled, then the cooling agent, here assumed to be cooling water and functioning as a first heat carrier for a first heat energy source (the engine 3) of the apparatus, flows through these lines 12 to 16. In the line branch 12 there are located two regulating valves 17 and 18 which serve to adjust the through flow or rate of flow of the cooling agent through the lines 12 to 16. Between the line branches 14 and 15 there is arranged a heat exchanger 19 by means of which the first heat carrier—here assumed to be cooling water—flowing in the line 14 can be heated-up in a manner to be explained more fully hereinafter. The line branch 15 then leads to a end-use or utility heat exchanger 20, which, for instance, may be designed, as a room or space heater. From the heat exchanger 20 the line branch 16 then leads backs to the internal-combustion engine 3.

The brake 5 is for generating a second source of thermal or heat energy, and preferably designed as a water brake having a schematically indicated resistance body 5a which moves in a water bath 5b and heats up the water of such bath which constitutes the first heat carrier. This brake 5 has a fresh water infeed line or conduit 21 and a circulation line or system incorporating the line branches or conduits 22, 23 and 24 with the portion of the line 12 that extends between the lines 22 and 24 and which includes the valve 17 constituting a shunt line for the brake 5, as shown in FIG. 1. Further, there is provided a fresh water-regulation valve 25 and a hot water-regulation valve 26. As to the liquid brake 5 there also could be used instead of water a different liquid serving as the first heat carrier of the apparatus.

Continuing, by means of a line or conduit 27 fresh air is infed to the internal-combustion engine 3 and previously passes a suction filter 28 and a sound absorber 29. By means of a line or conduit 30 fuel is infed to the engine 3. An exhaust gas line or conduit 31 of the combustion chamber 3a of the engine 3 leads through the heat exchanger 19 and then by means of a sound abosrber 32 or the like to the exhaust line or conduit 33.

Upon passage of the exhaust gas line 31 through the heat exchanger 19 the exhaust gas line 31 is connected with a second heat carrier merely generally indicated by reference character 80. The heat exchange between the exhaust gases, which gases constitute a third source of heat energy, flowing in the exhaust gas line 31 and the first heat carriers flowing through the lines or conduits 14 and 15 occurs by means of the second heat carrier at the heat exchanger 19, for instance available in the form of a liquid bath. Thus, the exhaust gas line 31 in the heat exchanger 19 can be surrounded by the second heat carrier in the form of a liquid. However, the heat exchaner 19 also can be designed as a container for receiving the second heat carrier as a liquid and into which opens the exhaust gas line 31, in order to transfer the heat of the exhaust gases to the second heat carrier and in order to simultaneously scrub the exhaust gases in the third heat carrier.

Having now had the benefit of the discussion of the apparatus structure of FIG. 1 its mode of operation will now be considered and is as follows: The internal-combustion engine 3 which is preferably a Diesel engine is started by the electrical starter 10 by means of the drive stage or connection 11 and the shaft journal or shafting 1. Once the Diesel engine has started-up, then it sucks-up air by means of the line or conduit 27, recieves fuel by means of line or conduit 30 and drives the shaft journals or shafts 1 and 2. Owing to the freewheeling coupling 9 the starter 10 is not driven by the engine 3. By means of the coupling 7 the generator 4 is driven and delivers the generated electrical energy into the power network 6. By means of the coupling 8 the brake 5, preferably constructed as a water brake, is driven and heats its water. Fresh water can be infed to the brake 5 by means of the line or conduit 21. If the engine 3 is water-cooled, then the hot cooling water flows by means of the line 12 and then comingles with the water in the line or conduit 14 and which has been heated up in the brake 5 and then flows to the heat exchanger 19. At this location there occurs a further heat transfer from the exhaust gases to the water flowing in the lines or conduits 14 and 15. The line 15 leads, for instance, to the room or space heater 20. The return flow of the water is accomplished by means of the line or conduit 16. By means of the regulating valves 17, 18 and 26 it is possible to regulate the through flow or throughput rate of the first and second heat carriers.

In the case where the engine 3 is air-cooled, cooling air heated by the engine constitutes a first heat carrier with the water heated by the brake constituting a second heat carrier and the heat carrier 80 for transferring heat energy from the exhaust gas constitutes a third heat carrier.

Figure 2:
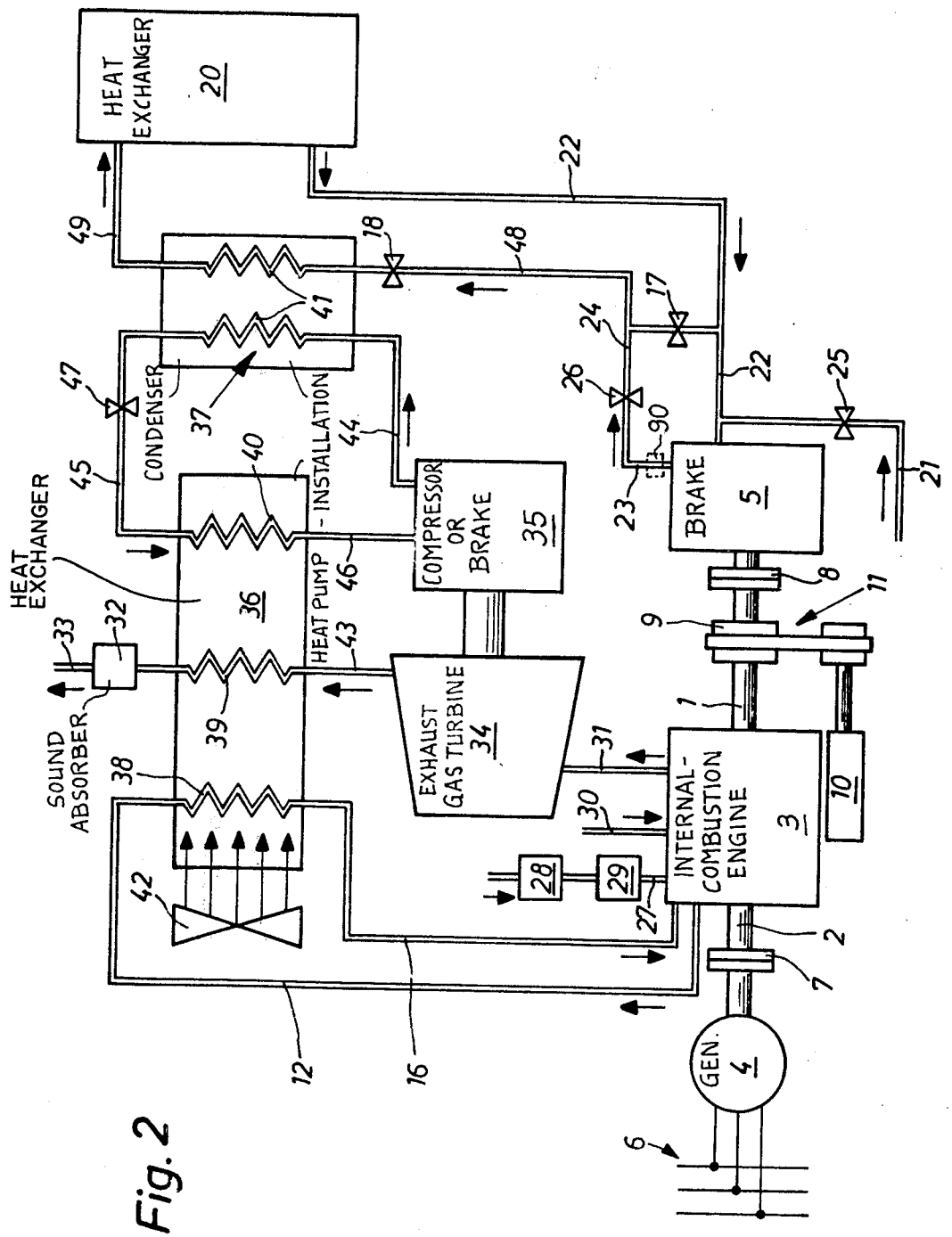
FIG. 2 schematically illustrates a second exemplary embodiment of the invention.

Now in the description to follow there will be considered the modified apparatus shown in FIG. 2. With this exemplary embodiment of apparatus there have been generally used the same reference characters for the same components as employed for the arrangement of FIG. 1. The apparatus of FIG. 2 essentially consists of the apparatus structure explained above in conjunction with FIG. 1, but is augmented by a heat pump installation. With the construction of FIG. 2, the exhaust gas line 31 of the internal-combustion engine 3 leads to an exhaust gas turbine 34 serving to drive a compressor 35 (which as will be explained hereinafter also may be replaced by a second brake) of a heat pump installation. This heat pump installation includes a heat exchanger 36 and a condenser 37. The heat exchanger 36 is provided with three heat exchangers 38, 39 and 40. The evaporator 36 has infed thereto, for instance by means of a blower 42, the ambient air of the apparatus. This ambient air is heated by the heat exchanger 38 by means of the hot cooling water of the internal-combustion engine 3 which flows through the lines 12 and 16. Furthermore, this air is heated-up by means of the heat exchanger 39 by the exhaust gases of the exhaust gas or exhaust driven turbine 34, these exhaust gases flowing through the line or conduit 43. Between the compressor 35, the condenser 37 and the heat exchanger 36 a cooling agent flows in the line branches 44, 45 and 46. A valve 47 is arranged in the line branch 45. The construction of this heat pump installation is known.

The heat carrier, in other words, the water or other heat carrying agent which is heated-up by the brake 5, flows by means of the line branches or lines 48 and 49 to the useful heat exchanger 20 and a return flow is accomplished by means of the line or conduit 22. In the line branches 48 and 22 there are arranged the regulating valves 17 and 18.

At this point in the description to follow there will now be considered the mode of operation of the apparatus of FIG. 2, and the working procedures which have already been explained in conjunction with the arrangement of FIG. 1 will not be here repeated. The ventilator or fan 42 or equivalent structure conveys external or ambient air through the heat exchanger 36 and in its ribbed piping of the heat exchanger 40 there vaporizes cooling agent while taking-up heat from the afore-mentioned air. The cooling agent vapor is sucked-up by the compressor 35 by means of the line or conduit 46 and at elevated pressure conveyed through the line or conduit 44 into the condenser 37 where it, while delivering heat to the water flowing through such condenser 37, is liquified. The liquified cooling agent then flows by means of the line or conduit 45 via the valve 47 again to the heat exchanger 36. In this way the water heated by the liquid brake 5, and which flows via the lines 23, 24 and 48 through the condenser 37, is heated-up by the heat pump installation and flows by means of the line 49 to the useful heat exchanger 20. This useful heat exchanger 20 can be employed for hot water and/or consumable or potable water.

According to a further modification of the apparatus, it is possible to use instead of a heat pump installation, the exhaust gas turbine 34 shown in FIG. 2 for driving a second brake, similar to the brake 5, and intended to produce thermal energy. In this case, and as indicated above, instead of the compressor 35 there would be provided such second brake, so that conceptually element 35 also can be considered to constitute a second brake.

According to a further not particularly illustrated embodiment of the apparatus the exhaust gas line 31 of the engine 3, shown in FIG. 1, could be connected with the heat exchanger 36 of the heat pump installation shown in FIG. 2.

As already mentioned, there is preferably utilized as the internal-combustion engine a Diesel engine. Such has lower fuel requirements owing to its improved thermal efficiency at its higher compression, and the fuel itself needed to drive such type engine also is less expensive to produce. Furthermore, a Diesel engine has a slower slope of the partial load operating line. Basically, the internal-combustion engine also could be in the form of a different piston engine, rotary piston engine or gas turbine. The internal-combustion engine used in practicing the invention constitutes a thermoengine having an internal combustion.

The couplings 7 and 8 used in the illustrated embodiments of FIGS. 1 and 2 are present in order to be able to selectively drive only the generator 4 or only the brake 5 of the engine 3.

The mentioned heat pump installation also could be operated in a different manner. Thus, for instance, its compressor could be driven, by way of example, also mechanically by the engine 3. By means of the aforementioned heat carriers there also could be heated an absorber or adsorber serving to drive a heat pump installation working without any compressor. Of course, this last-mentioned heat pump installation also could be present in addition to a heat pump installation working with a compressor.

The brake 5 can be simply structured in the form of a feed pump, for instance a centrifugal pump which works against a resistance, for instance a throttle, schematically indicated in phantom lines by reference character 90 in FIG. 2, in order to convert the kinetic energy of the water (first heat carrier) into heat. In such case the valve 26 can be considered to constitute a throttle or other resistance.

The afore-mentioned heat pump installation, apart from producing the thermal energy, naturally also can be used for cooling purposes.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for generating thermal energy and electrical energy, said apparatus comprising:
    an internal combustion engine having a power take-off shaft means, said internal combustion engine having at least one combustion chamber and means for conducting a cooling fluid in heat exchange relationship with said combustion chamber for receiving thermal energy therefrom, the thermal energy provided from said combustion chamber constituting a first source of thermal energy;
    generator means for generating electrical energy connected to said power take-off shaft means;
    a brake means connected to said power take-off shaft means for generating thermal energy in response to power applied thereto from said internal combustion engine, means for conducting a cooling fluid in heat exchange relationship with said brake means for receiving thermal energy therefrom, the thermal energy provided from said brake means constituting a second source of thermal energy;
    an exhaust gas line leading from said combustion chamber of said internal combustion engine and means for conducting a cooling fluid in heat exchange relationship with the exhaust gases for receiving thermal energy therefrom, the thermal energy provided from the exhaust gases constituting a third source of thermal energy; and
    conduit means for connecting said sources of thermal energy in a closed circuit with an end-use heat exchanger, said brake means connected into said closed circuit across a shunt line portion of said closed circuit.

2. The apparatus as defined in claim 1, wherein:
    said heat exchanger means comprises a heat exchanger for hot water and a heat exchanger for consumable water.

3. The apparatus as defined in claim 1, further including:
    a heat exchanger through which leads the exhaust gas line;
    said exhaust gas line being surrounded in said heat exchanger by a heat carrier provided in the form of a liquid.

4. The apparatus as defined in claim 1 further including:
    container means into which opens the exhaust gas line and receiving a liquid serving as a heat carrier in order to receive thermal energy from the exhaust gases and in order to scrub the exhaust gases in said liquid.

5. The apparatus as defined in claim 1, wherein:
    said internal-combustion engine is a Diesel engine.

6. The apparatus as defined in claim 1, wherein:
    said brake means comprises a water brake having a water bath in which moves a resistance body for heating up the water of the water bath and constituting the first heat carrier.

7. The apparatus as defined in claim 1, wherein:
    said brake means comprises a feed pump for a liquid;
    resistance means against which operates said feed pump in order to convert the kinetic energy of the moved liquid into heat.

8. The apparatus as defined in claim 7, wherein: said feed pump comprises a centrifugal pump.

9. The apparatus as defined in claim 7, wherein: said resistance means comprises a throttle means.

* * * * *